UNITED STATES PATENT OFFICE.

LEO H. BAEKELAND, OF YONKERS, NEW YORK.

INDURATED PRODUCT AND METHOD OF PREPARING SAME.

942,852. Specification of Letters Patent. Patented Dec. 7, 1909.

No Drawing. Original application filed July 13, 1907, Serial No. 383,684. Divided and this application filed April 18, 1908. Serial No. 427,874.

*To all whom it may concern:*

Be it known that I, LEO H. BAEKELAND, a citizen of the United States, residing at Yonkers, in the county of Westchester and State of New York, have invented certain new and useful Improvements in Indurated Products and Methods of Preparing the Same, of which the following is a specification.
In my prior application, Ser. No. 358,156, filed February 18, 1907, I have described and claimed a method of indurating fibrous or cellular materials consisting in impregnating or mixing them with a phenolic body and formaldehyde and causing the same to react within the body of the material to yield an insoluble condensation of dehydration product. In the course of this reaction considerable quantities of water are produced or separated, and this may in certain instances be objectionable or inconvenient.

I have now discovered that an improved product may be prepared by effecting the separation of the bulk of the water produced during the reaction or added with the reacting bodies before hardening the reaction product. By proceeding in this manner a more complete control of the reaction is secured and other important advantages are attained as hereinafter set forth.

In practicing the process I may use commercial phenol, or cresol or its homologues or other phenolic bodies. I may employ commercial formaldehyde or solutions of anhydrous formaldehyde in phenol; or if desired the polymer of formaldehyde, which on heating splits up into anhydrous formaldehyde, may be used. Dehydrated mixtures of formaldehyde and a phenolic body may be very simply prepared by adding to the water-containing mixture of commercial cresol and commercial (40%) formaldehyde a sufficient proportion of a solid water-soluble salt capable of absorbing or separating water from the mixture. Under these conditions there are formed immediately two distinct layers, the lower one being a dense aqueous solution of the added salt, and the upper the dehydrated mixture. Such soluble salts as calcium chlorid and sodium chlorid are suitable for use in this manner. The dehydrated mixture may be used directly for impregnation and has the advantage of avoiding the introduction into the material of the considerable quantity of water present in commercial cresol and formaldehyde.

In most instances I prefer to heat the mixture of phenol or its homologues and formaldehyde, alone or in presence of catalytic or condensing agents, the formaldehyde being present in about the molecular proportion, that is to say about equal volumes of commercial cresylic acid and commercial formaldehyde. Under these conditions the bodies react upon each other and yield a product consisting of two liquids which separate or stratify on standing. The lighter or supernatant liquid is an aqueous solution which contains the water resulting from the reaction or added with the reagents, whereas the heavier liquid is oily or viscous in character and contains the first products of chemical condensation or dehydration. The liquids are readily separated or the water may be eliminated by evaporation. The oily liquid obtained as above described is found to be soluble in or miscible with alcohol, acetone, phenol and similar solvents or mixtures of the same. This oily liquid may be further submitted to heat on a water- or steam-bath in order to thicken it and to expel any water which it may still contain.

If the reaction be permitted to proceed further the condensation product may acquire a more viscous character, becoming gelatinous or semi-plastic in consistence, or even solid at lower temperatures. This modification of the product is fusible although insoluble or incompletely soluble in alcohol, but soluble or partially soluble in acetone or a mixture of acetone and alcohol. The condensation product having either the oily or semi-plastic character may be subjected to further treatment as hereinafter described. This condensation product, or the dehydrated mixture of a phenolic body and formaldehyde, may be mixed with or caused to impregnate wood or other fibrous or cellular materials, and this impregnation may be effected or facilitated by any of the well known methods, as for instance slight heating, vacuum impregnation, injection by force or under pressure, or the use of suitable solvents; or it may be applied by simple soaking or immersion, or by means of a brush or similar contrivance.

Whether the dehydrated mixture of phenol and formaldehyde or the oily or viscous initial condensation product thereof be used for impregnation, the aim of the process is to convert the materials into a final product of condensation which is an infusible, hard material of resinous appearance, insoluble in alcohol, acetone and other usual solvents and little or not at all affected by most chemical reagents, as for instance acids or alkalies. In order to obtain this transformation into the final product heat is applied, and the transformation may be facilitated by the addition of small proportions of catalytic or condensing agents. At temperatures below 100° C., the reaction is very slow and is often incomplete. At higher temperatures vapors of formaldehyde and the like may escape abundantly and thereby cause foaming and the production of bubbles, such escape involving moreover a loss of the reagent and disturbing the proportions between the constituents of the mixture or compound, all of which would prevent the formation of a product of maximum hardness and of uniform texture.

In order that I may avail myself of the advantage of higher temperatures I prefer to harden the composition or indurate the fibrous or cellular material in a closed vessel or mold under pressure, under which conditions the operation proceeds with precision and a uniform result may be attained.

According to circumstances, impregnation may be made as thorough as possible, or may be limited to the outer zone or outer layers of the wood in such manner as to produce around the softer core or body a hardened protective layer, which however extends deeper than a mere varnish or surface coating.

The methods as described for wood can be used for any fibrous or cellular material whether of organic or inorganic origin. In this manner pulp board or asbestos board or objects made of these or similar materials can be impregnated and hardened. Or the fibrous or cellular materials may be mixed in bulk with the dehydrated mixture or the initial condensation product thereof, and pressed or shaped as desired by the use of a suitable mold; or they may be prepared in the form of a block or of a regular or irregular mass which may be cut, sawed, turned or otherwise manipulated to any desired form or size.

Whereas for organic materials such as wood it is desirable not to heat to a temperature above 110–140° C., in order to avoid injury to the fiber, in the case of materials of inorganic origin such as asbestos considerably higher temperatures may be employed.

The word "phenol" as employed in the claims is intended to include the homologues of phenol or other phenolic bodies; and the word "formaldehyde" is intended to include the polymers of formaldehyde.

This application is a division of my prior application, Serial No. 383,684, filed July 13, 1907.

I claim:—

1. The method of indurating fibrous or cellular materials which consists in mixing formaldehyde and a phenolic body in proportions to yield an insoluble and infusible reaction product, separating water from the mixture, applying the resulting substantially water-free product to the fibrous or cellular material, and hardening the composition.

2. The method of indurating fibrous or cellular materials which consists in mixing formaldehyde and a phenolic body in proportions to yield an insoluble and infusible reaction product, separating water from the mixture, applying the resulting substantially water-free product to the fibrous or cellular material, and hardening the composition by simultaneous application of heat and pressure.

3. The method of indurating wood which consists in mixing formaldehyde and a phenolic body in proportion to yield an insoluble and infusible reaction product, separating water from the mixture, applying the resulting substantially water-free product to the wood and hardening the composition.

4. The method of indurating wood which consists in mixing formaldehyde and a phenolic body in proportion to yield an insoluble and infusible reaction product, separating water from the mixture, applying the resulting substantially water-free product to the wood and hardening the composition by simultaneous application of heat and pressure.

5. As a new composition of matter wood cell tissue impregnated with an infusible and insoluble condensation product of phenol and formaldehyde.

6. As a new composition of matter, a fibrous or cellular material impregnated with an infusible and insoluble condensation product of phenol and formaldehyde.

In testimony whereof, I affix my signature in presence of two witnesses.

LEO H. BAEKELAND.

Witnesses:
  MARY E. SCHOLDING,
  MARY L. SHORT.